(12) United States Patent
Liu et al.

(10) Patent No.: US 11,493,414 B2
(45) Date of Patent: Nov. 8, 2022

(54) TESTING SYSTEM FOR FLEXIBLE SAMPLE IN ELECTRONICS HAVING A RETRACTABLE HOLDER CONFIGURED TO CONFORM A SAMPLE BY A MANDREL

(71) Applicant: Flex Ltd., Singapore (SG)

(72) Inventors: Weifeng Liu, Dublin, CA (US); Jesus A. Tan, Fremont, CA (US); William L. Uy, San Jose, CA (US); Dongkai Shangguan, San Jose, CA (US)

(73) Assignee: Flex Ltd., Singapore (SG)

( * ) Notice: Subject to any disclaimer, the term of this patent is extended or adjusted under 35 U.S.C. 154(b) by 105 days.

(21) Appl. No.: 17/065,403

(22) Filed: Oct. 7, 2020

(65) Prior Publication Data

US 2022/0018746 A1    Jan. 20, 2022

Related U.S. Application Data

(60) Provisional application No. 63/051,464, filed on Jul. 14, 2020.

(51) Int. Cl.
*G01N 3/20* (2006.01)
*G01N 3/02* (2006.01)

(52) U.S. Cl.
CPC ............. *G01N 3/20* (2013.01); *G01N 3/02* (2013.01); *G01N 2203/0023* (2013.01); *G01N 2203/0037* (2013.01); *G01N 2203/0058* (2013.01); *G01N 2203/0222* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,367,641 A | * | 1/1983 | Mizutani | B21D 7/08 72/166 |
| 4,920,779 A | * | 5/1990 | Post | B21F 1/00 72/17.2 |

OTHER PUBLICATIONS

"IPC-9204, Guideline on Flexibility and Stretchability Testing for Printed Electronics," Feb. 14, 2017, 36 pages.

\* cited by examiner

*Primary Examiner* — Brandi N Hopkins
(74) *Attorney, Agent, or Firm* — Sheridan Ross P.C.

(57) ABSTRACT

Methods, devices, and systems for testing the flexibility of a sample such as an electronic device are provided herein. A testing system can have a motor operably connected to a mandrel such that the motor causes the mandrel to accurately and precisely rotate and cause the sample to conform to an outer surface of the mandrel. Moreover, a proximal end of the sample is secured to the outer surface of the mandrel, and the opposing distal end is controlled by a retractable holder such that the entire sample is subjected to a constant bend radius as the mandrel rotates. Other aspects and features such as controlling the environment around the mandrel and securing small samples to the mandrel are also described herein.

13 Claims, 12 Drawing Sheets

TESTING SYSTEM FOR FLEXIBLE SAMPLE IN ELECTRONICS HAVING A RETRACTABLE HOLDER CONFIGURED TO CONFORM A SAMPLE BY A MANDREL

CROSS REFERENCE TO RELATED APPLICATION

The present application claims the benefits of and priority, under 35 U.S.C. § 119(e), to U.S. Provisional Application Ser. No. 63/051,464 filed Jul. 14, 2020, entitled "ELECTRONICS BENDING FIXTURE DESIGN," of which the entire disclosure is incorporated herein by reference, in its entirety, for all purposes and for all purposes.

STATEMENT REGARDING FEDERALLY SPONSORED RESEARCH OR DEVELOPMENT

This invention was made with U.S. Government support under a Development Agreement (No. FA8650-15-2-5401) supported by an award by the Air Force Research Laboratory. The U.S. Government has certain rights in the invention.

FIELD

The present disclosure is generally directed to systems and methods for testing the flexibility of a sample such as an electronic device.

BACKGROUND

Flexible electronic devices are becoming more desirable due to a wide range of possible applications since flexible electronic devices can vary in shape with a human body in motion or conform to the rounded shape of a body part. For example, an electronic playbook can conform to an arm of an athlete or an electronic map can conform to an arm of a soldier. To withstand these rigorous applications, an electronic device needs to be tested for flexibility in terms of bending, twisting, folding, etc. Various protocols have been developed to test the flexibility of an electronic device including the Institute of Printed Circuits IPC-9204: Guideline on Flexibility and Stretchability Testing for Printed Electronics.

Existing testing systems use faceplates and rollers to bend and test only a small portion of a sample electronic device. The sample is not directly connected to the faceplates or rollers, and the existing testing system can therefore only be used for generally larger and/or longer samples. Another issue with existing testing systems is the lack of ability to uniformly bend a sample as existing testing systems will subject different portions of sample to different forces. In other words, the sample is not bent or conformed to a constant radius during testing. Thus, there is a need for a testing system that can test a smaller sample, that can test all portions of the sample at the same time, and that can accurately and precisely control various testing parameters such as bend radius and bend angle.

BRIEF SUMMARY

Systems, methods, and apparatuses of the present disclosure address these and other issues with previous testing systems. A testing system is described herein that can test smaller samples and control various parameters such as bend radius and bend angle. These testing systems can test all portions of a sample at the same time, instead of just one portion.

According to one embodiment, a testing system is provided that accurately and precisely controls various testing parameters such as bend radius and bend angle. A motor is provided that rotates a mandrel that has an outer surface on which a sample is secured. A control device can cause the motor to rotate the mandrel about a bend or mandrel angle to cause the sample to conform to the outer surface of the mandrel. With the control device, the motor can rotate the mandrel in one direction to conform the entire sample to the mandrel and then rotate the mandrel in the opposing direction to release the sample from conformance to the mandrel. The control unit can repeat this cycle any number of times in any number of ways to meeting testing protocols or standards for the sample.

According to one embodiment, a testing system is provided that bends the entire sample on an outer surface of a mandrel with a constant bend radius. As described above, the sample can conform to the outer surface of mandrel, and the outer surface can have a constant bend radius or radius of curvature. Thus, in some embodiments, the cross-sectional shape of a portion of the mandrel is circular with a constant radius or diameter. To conform the sample to the outer surface of the mandrel, one end of the sample is fixed to the outer surface, and the opposing distal end is free or not fixed to any component. Next, a retractable holder is positioned above the mandrel, and the retractable holder can have a roller that contacts the sample. As the mandrel rotates, the fixed proximal end of the sample moves away from the retractable holder, which causes the roller of the retractable holder to progressively conform the sample to the outer surface of the mandrel. The mandrel can rotate to a predetermined angle where the roller of the retractable holder contacts a portion of the sample at or near the distal end of the sample.

According to one embodiment, a testing system is provided that can accommodate smaller samples. Securing one end of the sample to the mandrel and incorporating a retractable holder allows for the testing of smaller samples. In addition, a sample carrier can be secured to the outer surface of the mandrel. The sample carrier can sandwich the sample between two flexible layers, and the sample and the sample carrier are both conformed to the outer surface of the mandrel, allowing for testing of even smaller samples.

According to one embodiment, a testing system is provided that accurately and precisely tests a portion of a sample. This testing system can have an upper member and a lower member that move relative to each other to bend a sample that extends through portions of the members. Generally, the members each have mandrels disposed between arms, and the sample extends through slots or gaps between mandrels of one set of arms of the upper member, between mandrels of a set of arms of the lower member, and between mandrels of another set of arms of the upper member. Thus, as the upper member moves, the sample bends about one or more mandrels.

According to one embodiment, a testing system is provided that encloses a volume around the mandrel and sample to control the environment within the volume. With an enclosed volume, devices such as heaters, coolers, humidifiers, dehumidifiers, etc. can control characteristics of the environment around the mandrel and sample. Moreover, these devices can be connected to a control device, which can cause these devices to make changes to the environment based on an established routine or set of instructions and/or readings from sensors that monitor the environment. It will be appreciated that the enclosed volume and environmental controls can be applied to any testing system described in or encompassed by the present disclosure.

These and other advantages will be apparent from the disclosure of the aspects, embodiments, and configurations contained herein.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

It should be understood that the diagrams are provided for example purposes only and should not be read as limiting the scope of the disclosure. Many other configurations are fully contemplated and included in the scope of the disclosure.

DETAILED DESCRIPTION

It is with respect to the above issues and other problems that the embodiments presented herein were contemplated. In general, embodiments of the present disclosure provide methods, devices, and systems for testing a flexible electronic device or sample. The use of a sample holder and a retractable holder along with other components and features allow the sample to be conformed to an outer surface of a mandrel such that the entire sample in uniformly bent. These benefits and others along with various embodiments are described herein.

Figure 1:
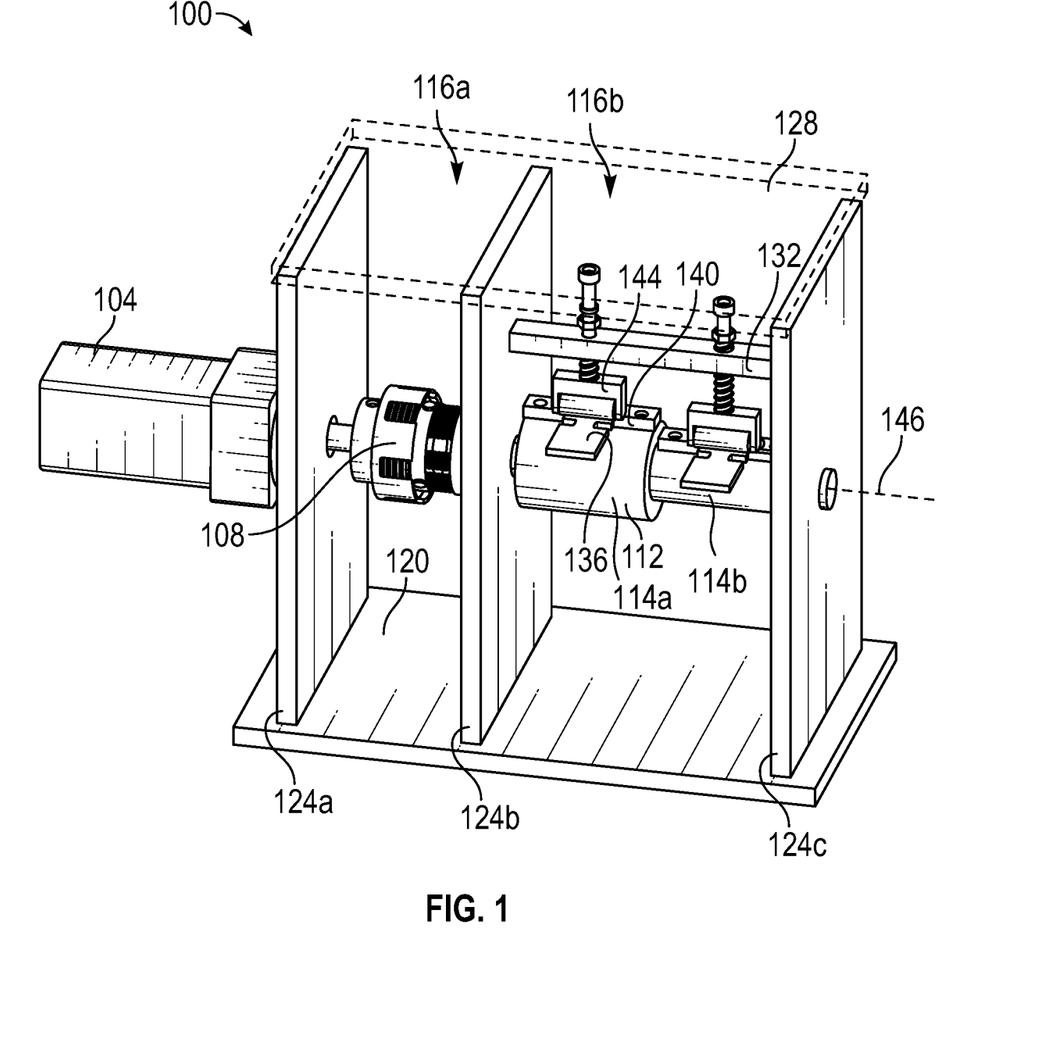
FIG. 1 is a perspective view of a testing system in accordance with embodiments of the present disclosure.

FIG. 1 is a perspective view of an exemplary testing system 100 for a sample 136. As shown, the testing system 100 generally comprises a motor 104 that is joined to a mandrel 112 via a coupling 108. The motor 104 can be any type of motor that drives an output shaft in a first direction and an opposing second direction. The motor 104 can be an electric motor powered by alternating current or direct current and can be a brushed motor or brush motor. Other types of motors 104 can also include linear motors, step motors, servo motors, etc. The output shaft of the motor 104 is connected to the coupling 108, which is a simple connection for transferring torque. In other embodiments, the coupling 108 can have other configurations such as a planetary gear system that changes the speed of rotation and torque. The coupling 108 also allows for different mandrels 112 to be swapped quickly and efficiently. As the mandrel 112 rotates in response to the motor 104, the sample 136 is conformed to the outer surface of the mandrel 112 and then released as the mandrel 112 rotates in the opposing direction to test physical characteristics of the sample 136.

The mandrel 112 has a first portion 114a with a larger radius than a second portion 114b such that multiple samples 136 can be tested simultaneously, or the same testing system 100 can be used to test the same sample 136 with different radii. In this embodiment, the larger first portion 114a is positioned closer to the motor 104 than the second portion 114b to reduce a torsion force on components of the testing system 100.

The holder 140 and the retractable holder 144 work together to conform the sample 136 to the mandrel 112 as the mandrel 112 rotates about a longitudinal axis 146. In FIG. 1, the holder 140 clamps one end of the sample 136 to the mandrel 112. The holder 140 can accomplish this with screws or fasteners that extend through the holder 140 and into the mandrel 112 to hold the sample 136 between the holder 140 and the mandrel 112. In other embodiments, the sample 136 is shaped such that one end of the sample 136 is confined between the holder 140 and the mandrel rather than held in place with a force. Further still, it will be appreciated that adhesives such as 3M® VHB series tape, interference fits, and other ways of joining two components can be used to fix one end of the sample 136 relative to one point on the outer surface of the mandrel 112.

Next, a distal end of the retractable holder 144 applies a predetermined force to the sample 136. A support 132 spans the second and third sidewalls 124b, 124c, and the retractable holder 144 is operably connected to the support 132. As described in further detail below, a roller can serve as the distal end of the retractable holder 144 so that as the mandrel rotates 112 from an initial angle to a final angle, the sample 136 moves into the roller, which freely rotates against the sample 136 and also holds the sample 136 against the curved outer surface of the mandrel 112. The mandrel 112 can rotate until the retractable holder 144 is positioned over a distal end of the sample 136. Thus, the entire sample 136 is bent rather than a single part of the sample 136, as is the case with prior art testing systems. The motor 104 rotates in the opposite direction and the mandrel 112 moves from the final mandrel angle back to the initial mandrel angle as shown in FIG. 1, and the sample 136 is allowed to freely extend and cantilever outwards. To fulfil some testing standards, the testing system 100 repeatedly conforms the sample 136 to the mandrel 112 and then releases the sample 136 over multiple cycles. Physical characteristics of the sample 136 can be monitored before, during and after testing to determine if the sample 136 complies with the relevant standard.

The motor 104, the coupling 108, and the mandrel 112 are supported by a bottom member 120, sidewalls 124a 124b, 124c that extend upward from the bottom member 120, and a top member 128. The motor 104 can be affixed to an outer surface of the first sidewall 124a such that the output shaft from the motor 108 extends through the first side wall 124a. The coupling 108 can be positioned in a first volume 116a defined by the first and second sidewalls 124a, 124b. Next, the mandrel 112 is positioned in a second volume 116b defined by the second and third sidewalls 124b, 124c where the distal end of the mandrel 112 is supported by the third sidewalls 124c.

Figure 2A:
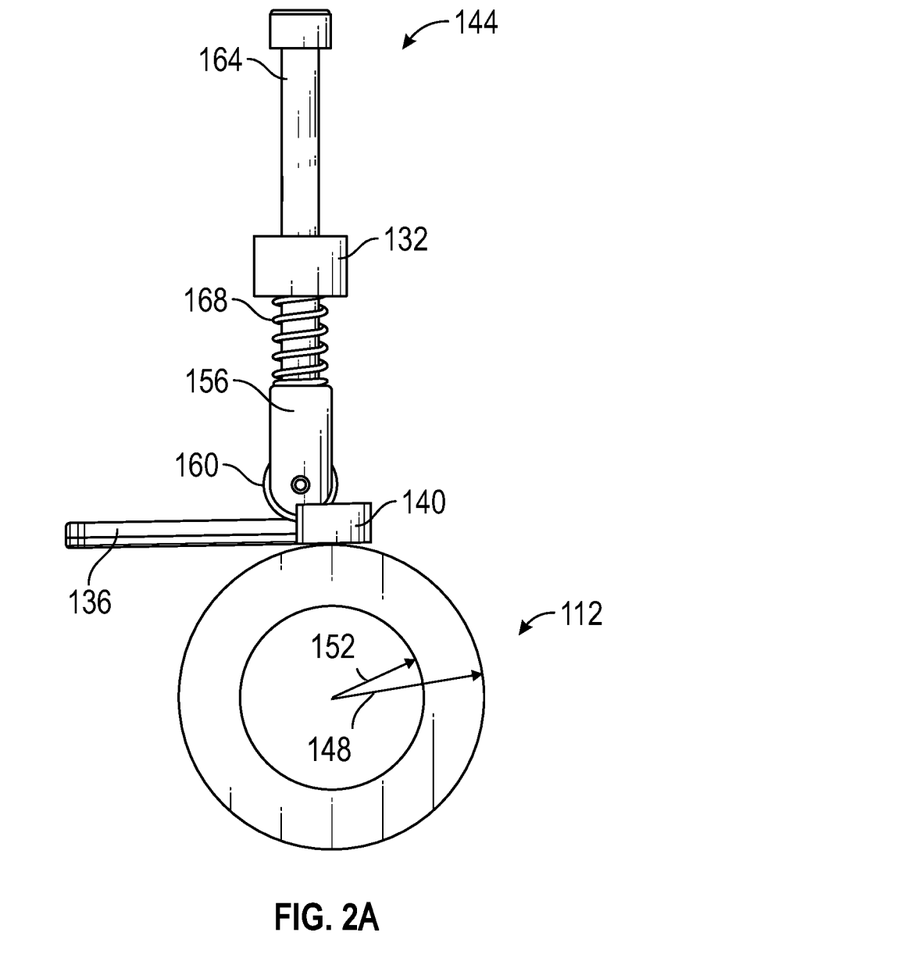
FIG. 2A is a side elevation view of a mandrel and a retractable holder of the testing system in FIG. 1 in a first position in accordance with embodiments of the present disclosure.
Figure 2B:
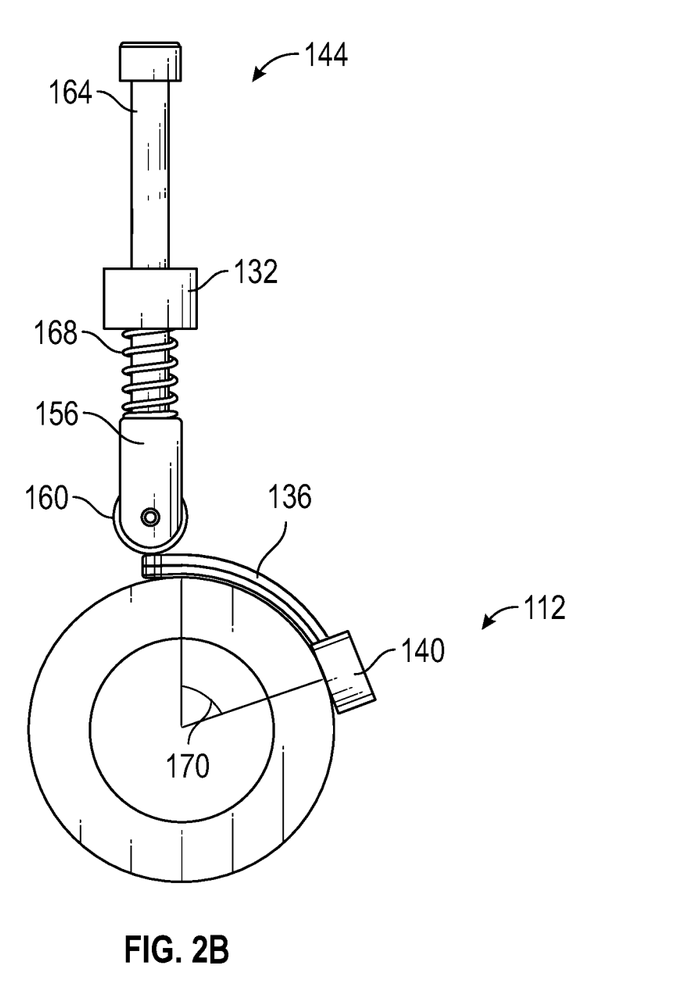
FIG. 2B is a side elevation view of a mandrel and a retractable holder of the testing system in FIG. 1 in a second position in accordance with embodiments of the present disclosure.

FIGS. 2A and 2B are side elevation views of the mandrel 112 in a first position and a second position, respectively. As shown in FIG. 2A, the mandrel 112 is in a first position, and the mandrel 112 has a first portion with a first radius 148 and a second portion with a smaller second radius 152. As the mandrel 112 rotates in a clockwise direction, the sample 136 conforms to the curved outer surface of the mandrel 112 as shown in FIG. 2B. Although two portions of the mandrel 112 are shown with differing radii 148, 152 it will be appreciated that the mandrel 112 can have a single portion or more than two portions. Moreover, although the mandrel 112 has a circular outer surface, it will be appreciated that the outer surface of the mandrel 112 can have any shape necessary to perform any test on the sample 136.

Figure 2C:
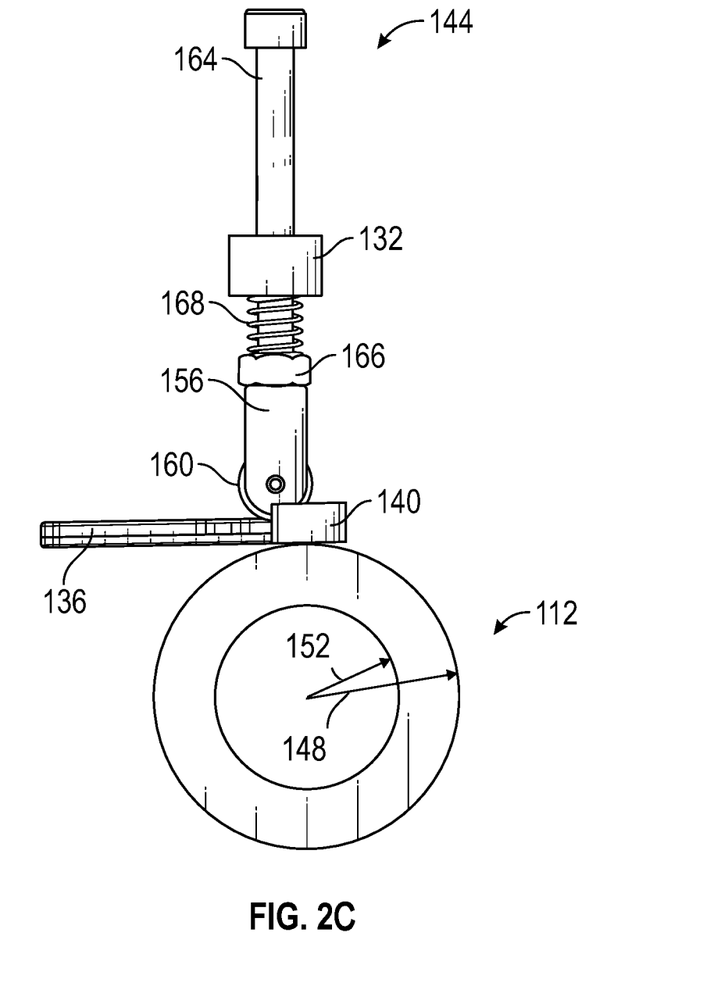
FIG. 2C is a side elevation view of a mandrel and a retractable holder with an adjustable nut of the testing system in FIG. 1 in a first position in accordance with embodiments of the present disclosure.

Also shown in FIG. 2A are the various components of the retractable holder 144. At a lower distal end, the retractable holder 144 comprises a roller 160 that rotates relative to a body 156. The roller 160 rotates about an axis that is substantially parallel to the longitudinal axis 146 in FIG. 1. A post 168 extends upwards from the body 156 and through the support 132. A bias member 168, in this embodiment a spring, is positioned about the post 168 and between the upper surface of the body 156 and the lower surface of the support 132 to cause the roller 160 to press into the sample 136 with a predetermined force. The bias member 168 can include a spring with a linear or non-linear response. Moreover, in some embodiments, the bias member 168 is adjustable where a nut 166, for example as shown in FIG. 3C, can be positioned about a threaded portion of the post 164 between the body 156 and the support 132 such that the bias member 168 contacts the nut 166 instead of the body 156. Thus, a user can turn the nut to adjust its position along a length of the post 164, which compresses the bias member 168 and adjusts the predetermined force acting on the sample 136. The predetermined force can also be adjusted by changing bias members 168, and it will be appreciated that the bias member 168 can include linear motors, pneumatic systems, or any other system that can apply a force onto the sample 136.

FIG. 2B shows the mandrel 112 rotated from an initial mandrel angle to a final mandrel angle 170. With the proximal end of the sample 136 secured by the holder 140 and the distal end of the sample 144 pressed by the retractable holder 144, the sample 136 conforms to the outer surface of the mandrel 112, and thus, the entire sample 136 is bent evenly along its length and along a constantly curved surface. The motor can rotate the mandrel 112 in the counterclockwise direction to return the mandrel 112 to the initial mandrel angle as shown in FIG. 2A where the sample 136 is allowed to freely cantilever outward. The motor can rotate the mandrel 112 back and forth between these positions through the necessary number of cycles to meet any testing standard or requirement.

Figure 3:
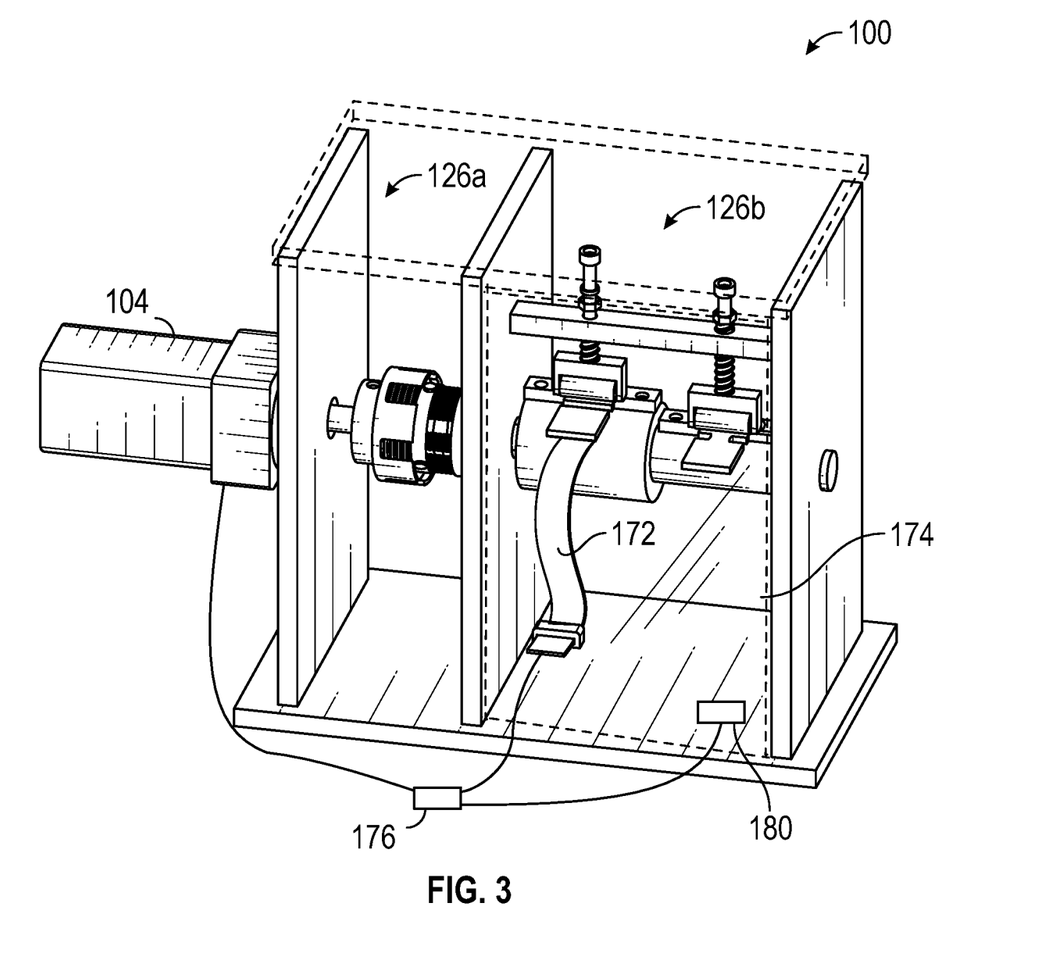
FIG. 3 is a perspective view of another testing system in accordance with embodiments of the present disclosure.

FIG. 3 shows an embodiment of the testing system 100 with an enclosed second volume 126b. The addition of a front wall 174 and a back wall fully enclose the second volume 126b in which the mandrel is positioned to control the testing environment for the sample. The environment can be characterized by any number of parameters such as temperature, humidity, air composition, etc. A corresponding environment device 180 can be positioned in, or operably connected to, the enclosed second volume 126b to control any one of these parameters. Thus, the environment device 180 can be a heater, a cooler, a humidifier, a dehumidifier, etc. A control unit 176 can be operably connected to the environment device 180 to control the device 180. The control unit 176 can cause the environment device 180 to perform actions based on a preprogrammed routine and/or inputs and data from the testing system 100. For example, the control unit 176 can be connected to a test cable 172, which is connected to a distal end of the sample 136. The test cable 172 has enough length to accommodate the change position of the sample 136 during testing, and the test cable 172 can receive data related to, for instance, a strain of the sample, a temperature of the sample, or a tensile strength of the sample. The data received through the test cable 172 from one or more sensors can be used for a post hoc analysis of the sample 136 and for other uses such as operating the environment device 180. Also shown in FIG. 3, is a connection between the control unit 176 and the motor 104 where the control unit 176 can control the actions of the motor 104 as well as any other component or device of the testing system 100.

Figure 4:
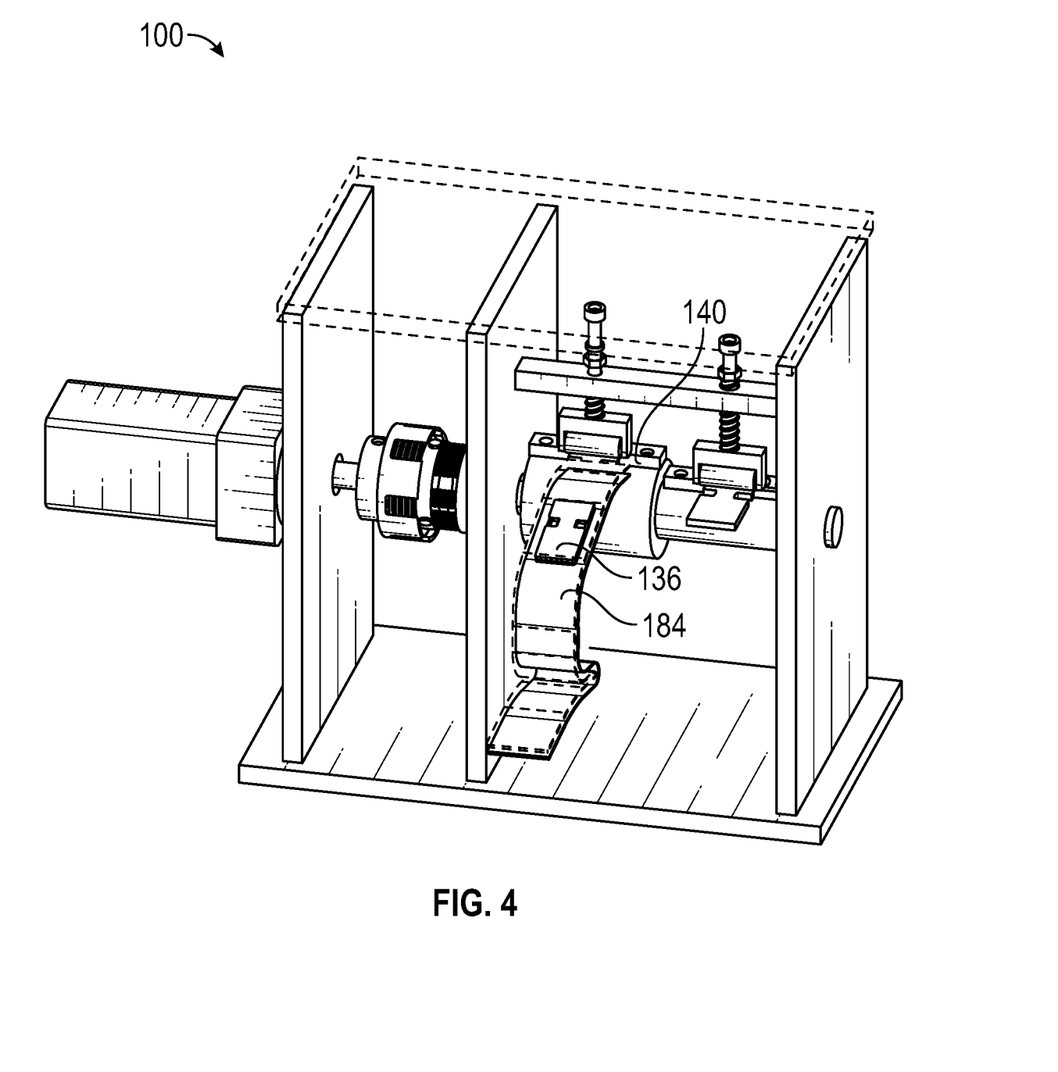
FIG. 4 is a perspective view of a testing system with a sample carrier in accordance with embodiments of the present disclosure.
Figure 5:
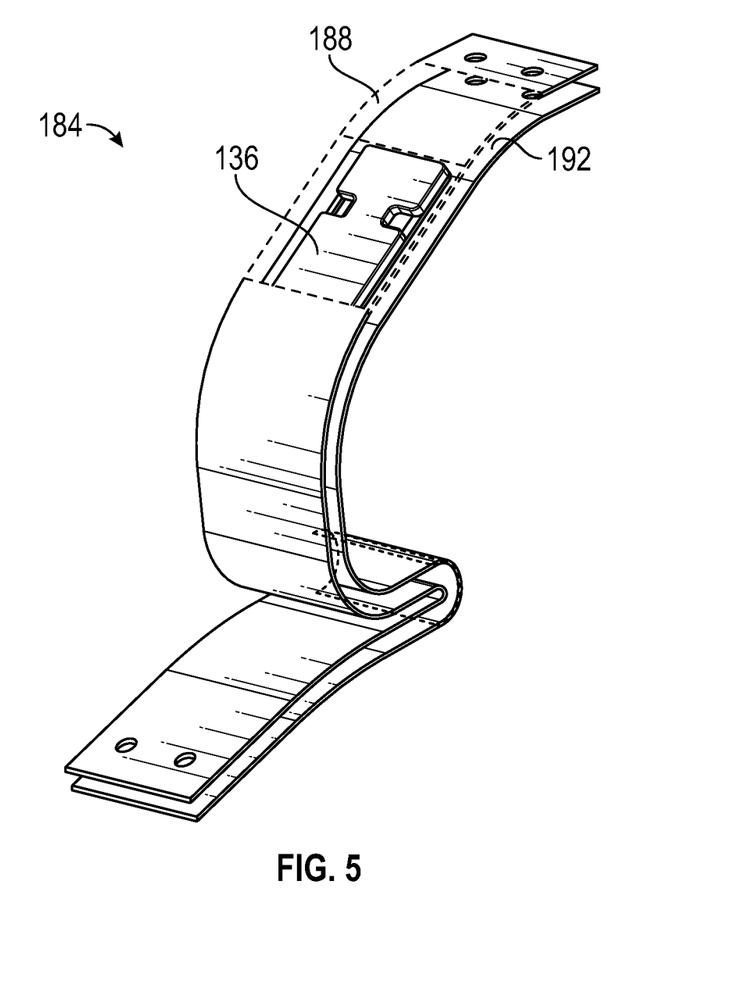
FIG. 5 is a perspective view of the sample carrier in FIG. 4 in accordance with embodiments of the present disclosure.

FIGS. 4 and 5 are perspective views of another embodiment of the testing system 100 and a sample carrier 184, respectively. Other embodiments can be effective for longer or medium-sized sample 136. However, as the sample 136 becomes smaller, it can be more difficult to secure directly to the mandrel. Thus, as shown in FIGS. 4 and 5, the sample 136 can be positioned in a carrier 184, which is then secured to the mandrel, for instance, via the holder 140. The carrier 184 can have a first flexible layer 188 and a second flexible layer 192 where the sample 136 is positioned between the layers 188, 192. Then, a proximal end of the carrier 184 is connected to the holder 140. When the mandrel rotates, both the carrier 184 and the sample 136 are conformed to the outer surface of the mandrel to accomplish the bend testing for smaller-sized samples 136.

Figure 6A:
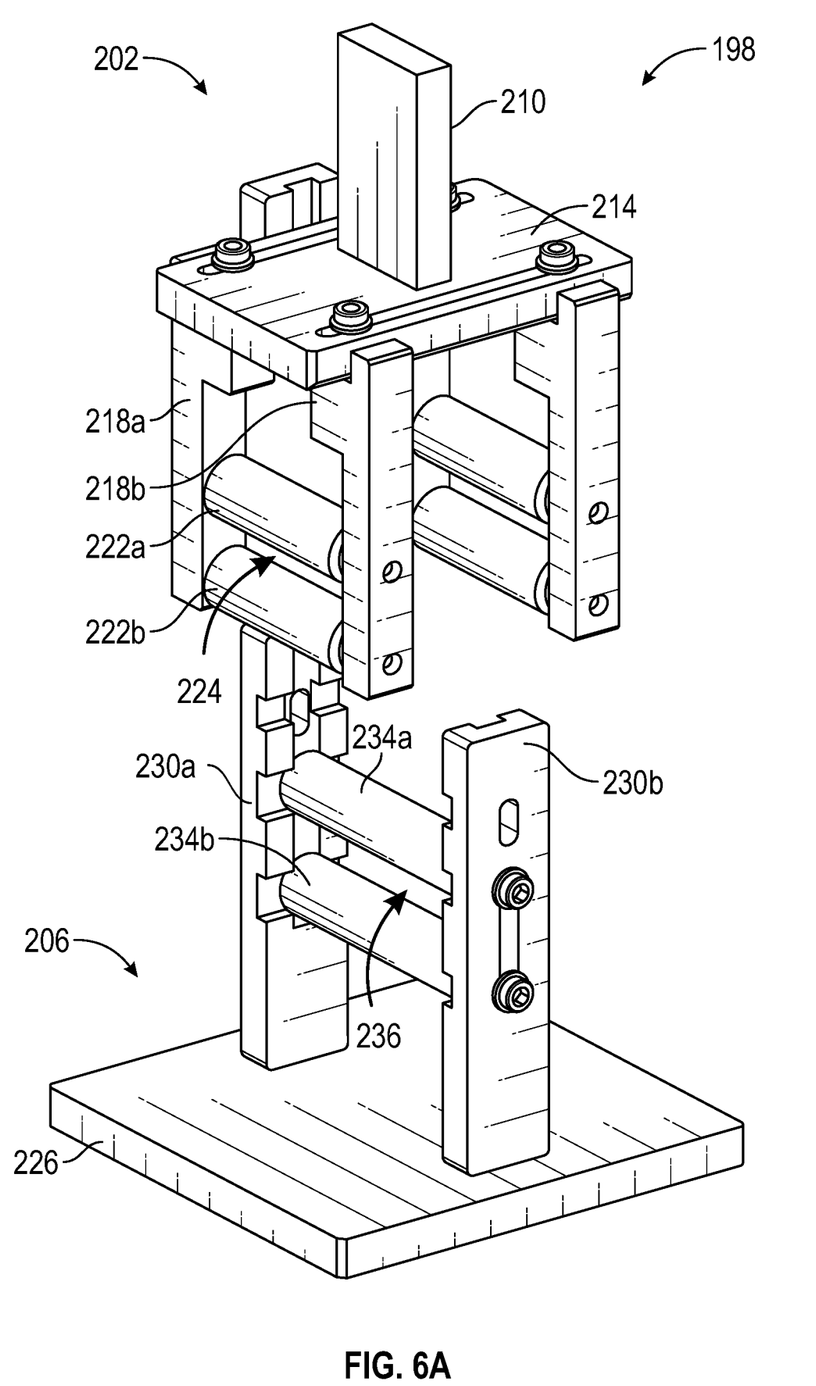
FIG. 6A is a perspective view of a testing system in a first position in accordance with embodiments of the present disclosure.
Figure 6B:
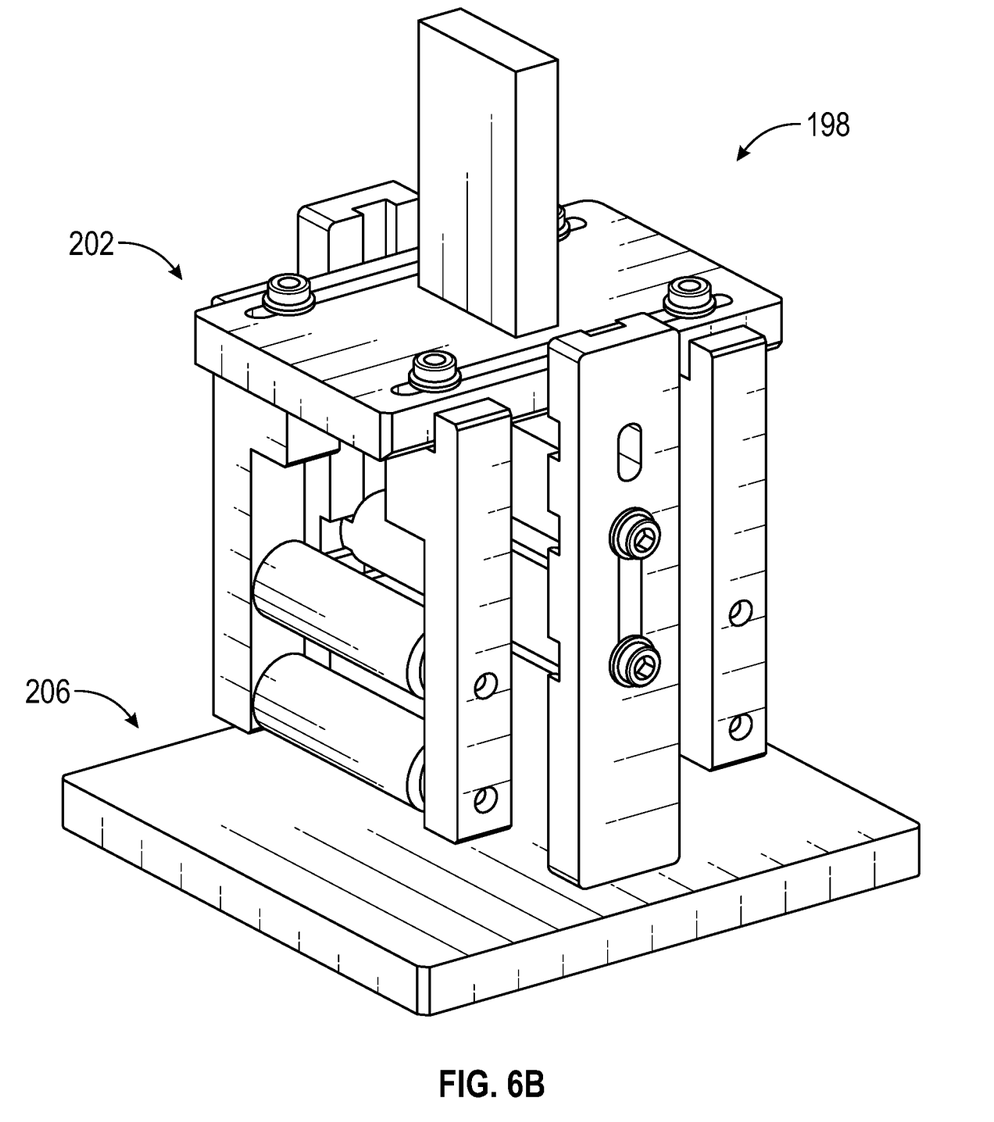
FIG. 6B is a perspective view of a testing system in a second position in accordance with embodiments of the present disclosure.

FIGS. 6A and 6B show a further embodiment of a testing system 198 in a first position and a second position, respectively. The testing system 198 generally comprises an upper member 202 that is movable to a lower member 206 to impart a force on a portion of a sample. The upper member 202 is connected to, for instance, an Instron® testing system that moves the upper member 202 between positions for a number of cycles, and the lower member 206 is connected to a non-moving surface.

The members 202, 206 have arms and mandrels that hold and impart a force on a sample. The upper member 202 first has a connector portion 210 that can engage the Instron® testing system, and an upper plate 210 that is connected to the connector portion 210. Then, arms 218a, 218b descend downwardly from the upper plate 210, and mandrels 222a, 222b extend between the arms 218a, 218b, and the mandrels 222a, 222b are freely rotatable and define a slot or gap 224 therebetween. As shown in FIG. 6A, a first set of arms 218a, 218b have two mandrels 222a, 222b extending therebetween. A second set of arms has a second pair of mandrels, and the two sets of arms are adjustable closer or further from each other via fasteners that extend through slots in the upper plate 214 and into the arms 218a, 218b.

Next, two arms 230a, 230b extend upwardly from a support plate 226 of the lower member 206. Two mandrels 234a, 234b are disposed between the arms 230a, 230b, and the mandrels 234a, 234b freely rotate and define a slot or gap 236 therebetween. As shown in FIG. 6A, the mandrels 234a, 234b can move up and down relative to the arms 230a, 230b via fasteners that extend through slots in the arms 230a, 230b and into the mandrels 234a, 234b. As shown in FIG. 6B, the upper member 202 can move downward relative to the bottom member 206 such that the upwardly-ascending arms 230a, 230b are positioned between a first set of downwardly-descending arms 218a, 218b and another set of downwardly-descending arms. While two downwardly-descending arms and one upwardly-ascending arm are depicted, it will be appreciated that the present disclosure encompasses further any number of downwardly-descending and upwardly-ascending arms in any number of configurations. Moreover, in some embodiments, only one mandrel extends between arms such as the first set of downwardly-descending arms 218a, 218b.

Figure 7A:
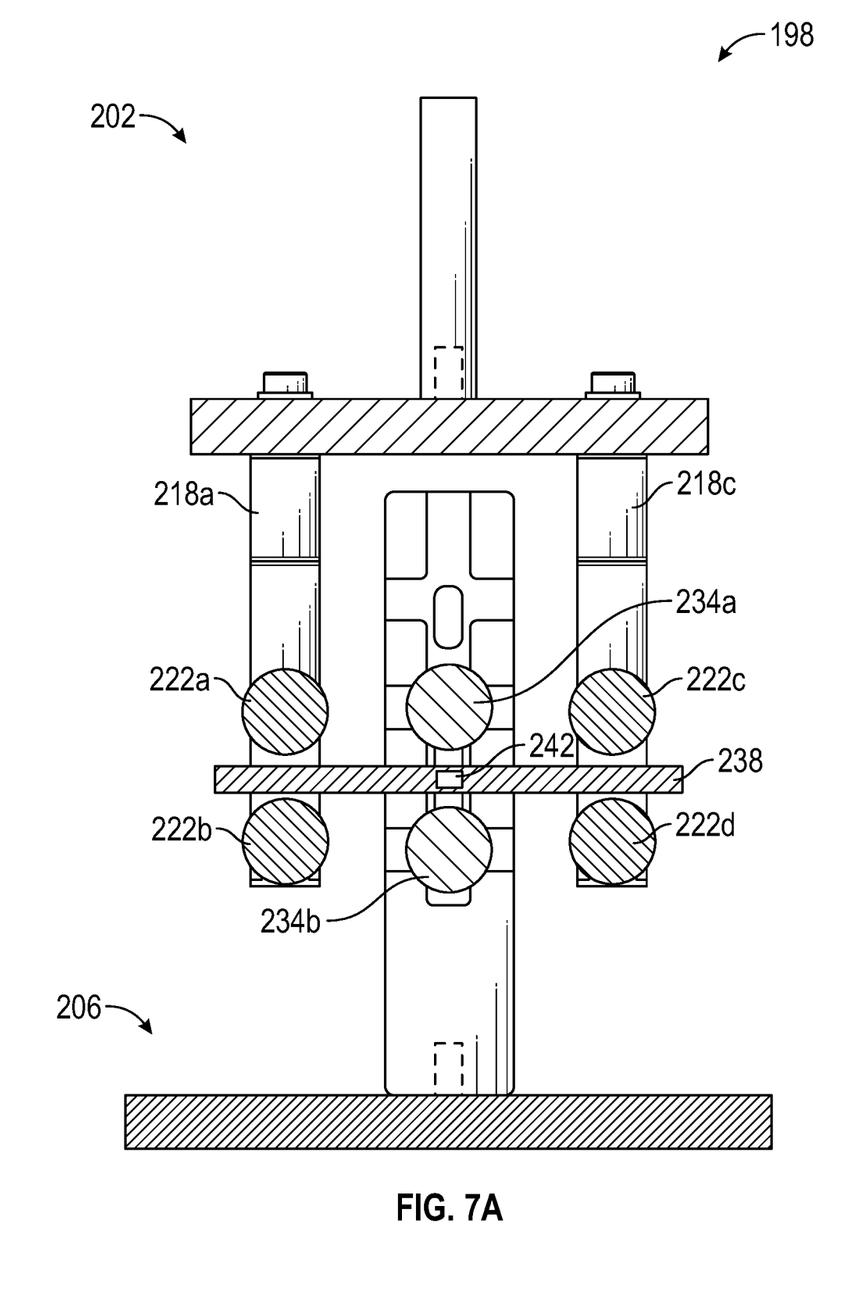
FIG. 7A is a cross-sectional, side elevation view of a testing system in accordance with embodiments of the present disclosure.
Figure 7B:
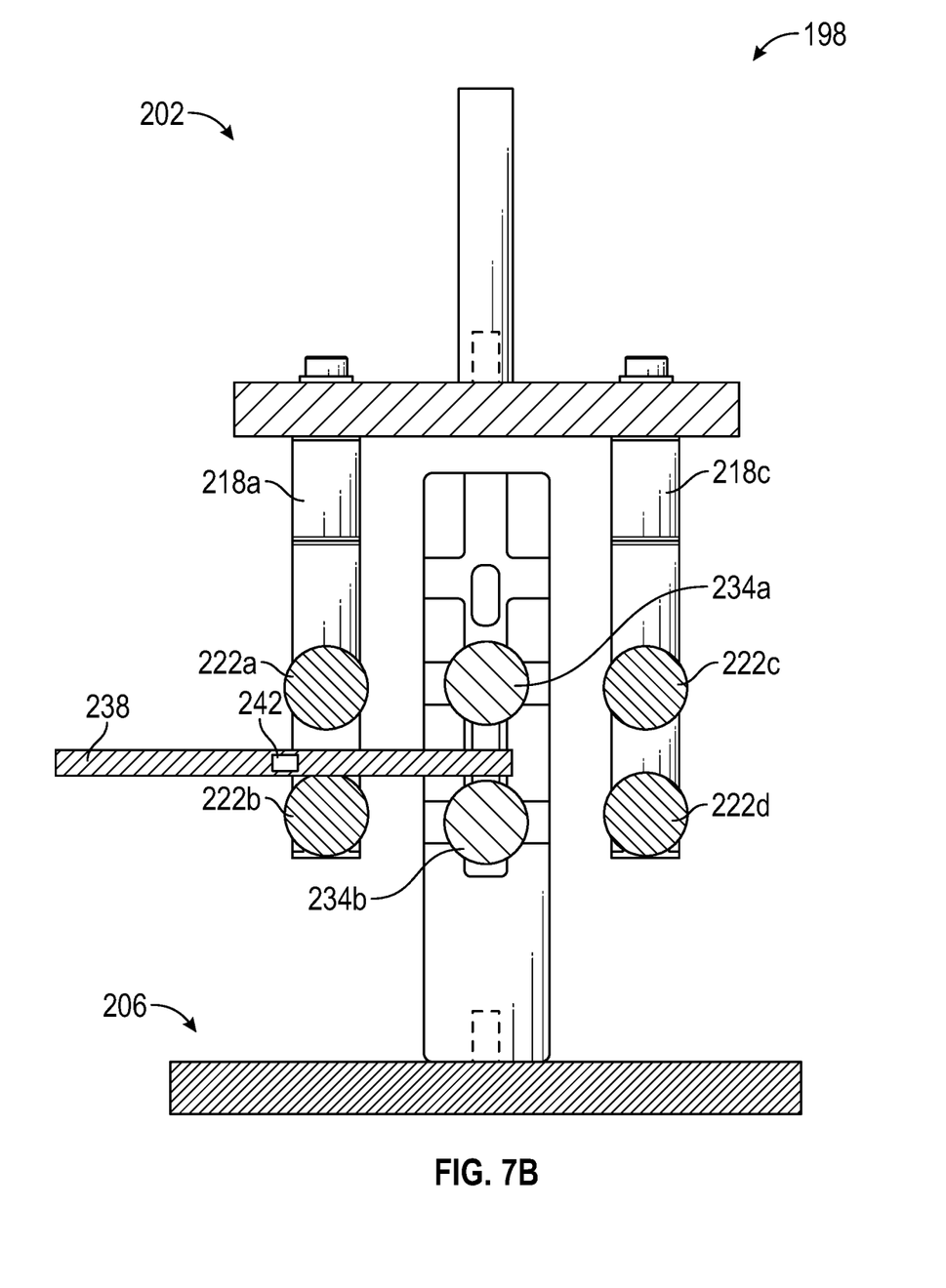
FIG. 7B is a cross-sectional, side elevation view of another testing system in accordance with embodiments of the present disclosure.
Figure 7C:
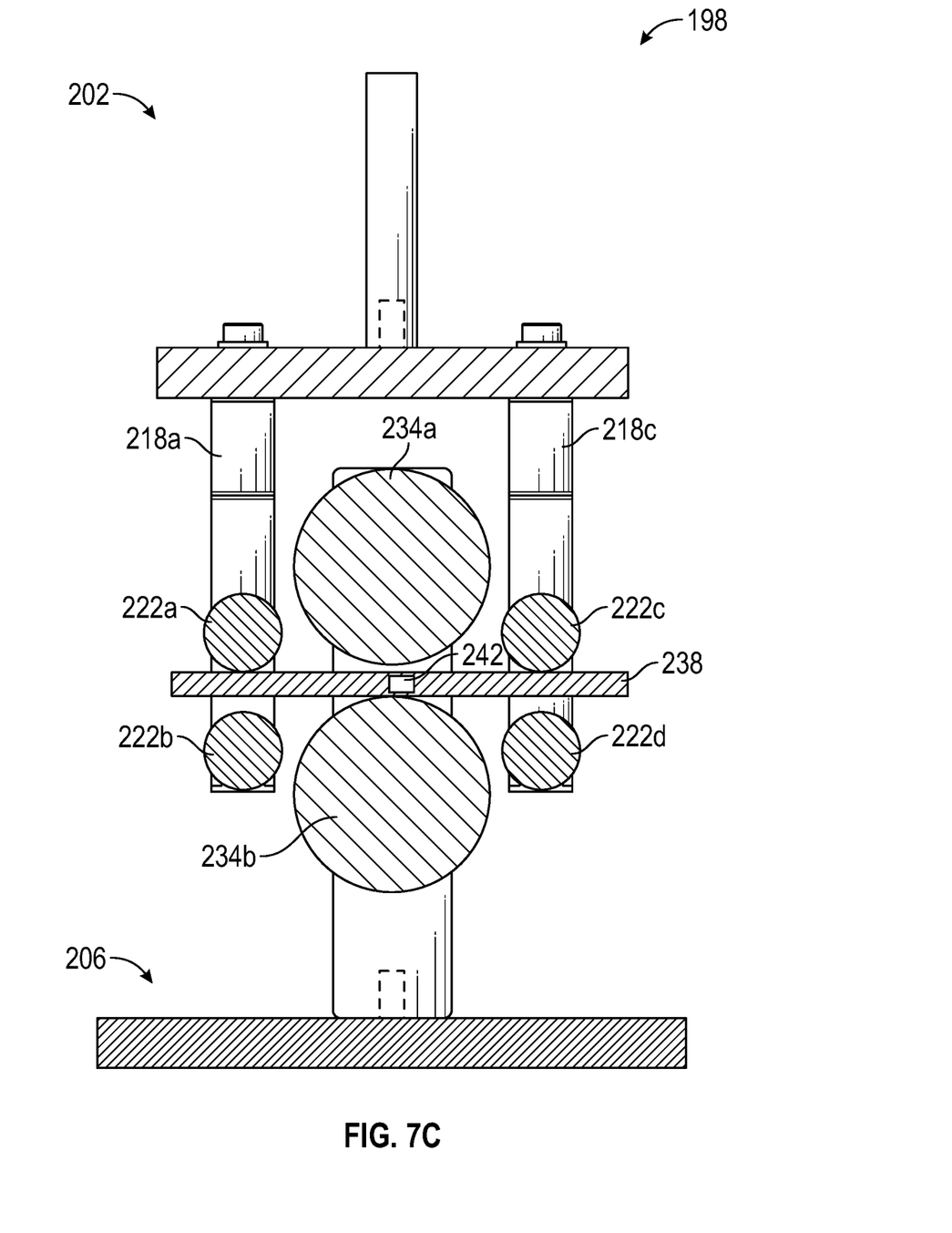
FIG. 7C is a cross-sectional, side elevation view of a further testing system in accordance with embodiments of the present disclosure.

FIGS. 7A-7C are cross-sectional, elevation views of various embodiments of the testing system 198 in FIGS. 6A and 6B. As shown in FIG. 7A, a sample 238 can be placed in the slots or gaps defined by the various mandrels 222a-d, 234a-b. As the upper member 202 moves, the sample is pressed against one of the mandrels 234a, 234b of the upwardly-ascending arms such that a portion 242 of the sample 238 is bent and conformed to an outer surface of one of the mandrels 234a, 234b. FIG. 7B shows the sample 238 in a different position such that different forced are imparted on the sample 238. FIG. 7C shows mandrels with different sizes and radii.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

One particular embodiment of the present disclosure is a testing system for a flexible sample, comprising: a motor that rotates a mandrel in a first direction about a longitudinal axis and in an opposing second direction, wherein a first portion of the mandrel has a first radius from the longitudinal axis to an outer surface of the mandrel, and a second portion of the mandrel has a second radius from the longitudinal axis to the outer surface of the mandrel, wherein the second radius is distinct from the first radius; a sample holder positioned on an outer surface of the mandrel, wherein the sample holder is configured to secure a sample to the first portion of the mandrel; and a retractable holder having a distal end that is biased toward the first portion of the mandrel such that the distal end contacts the sample with a predetermined force, wherein the retractable holder is configured to conform the sample to the outer surface of the mandrel as the mandrel rotates.

In some embodiments, the testing system further comprises a sample carrier extending between a first end and a second end, wherein the sample holder secures the first end of the sample carrier to the first portion of the mandrel; and a first flexible layer and a second flexible layer of the sample carrier that define a space therebetween configured to receive the sample to secure the sample to the mandrel. In various embodiments, the testing system further comprises at least one sidewall defining an enclosed volume around the first portion and the second portion of the mandrel, the sample holder, and the retractable holder, and wherein an environment device controls at least one parameter of the enclosed volume for testing of the sample. In some embodiments, the environment device is one of a humidifier, a dehumidifier, a heater, or a cooler.

In various embodiments the retractable holder comprises: a roller connected to a body such that the roller is the distal end of the retractable holder, and the roller is configured to rotate relative to the body about an axis that is parallel to the longitudinal axis; and a bias member that acts against the body to press the roller into the sample with the predetermined force. In some embodiments, the testing system further comprises a support positioned above the mandrel; and a post extending upward from the body through the support, wherein the bias member is a spring positioned about the post and acts against the support to press the roller into the sample with the predetermined force. In various embodiments, the testing system further comprises a nut threadably connected to the post between the body and the bias member such that the bias member contacts the nut to act against the body and press the roller into the sample with the predetermined force.

In some embodiments, the testing system further comprises a second sample holder positioned on the second portion of the mandrel, wherein the second sample holder is configured to secure a second sample to the second portion of the mandrel; and a second retractable holder having a distal end that is biased toward the second portion of the mandrel such that the distal end of the second retractable holder contacts the second sample with a second predetermined force, wherein the second retractable holder is configured to conform the second sample to the outer surface of the mandrel as the mandrel rotates. In various embodiments, the first portion of the mandrel is positioned closer to the motor than the second portion of the mandrel, and the first radius is larger than the second radius.

Another particular embodiment of the present disclosure is a method for testing a flexible sample, comprising: securing a sample to a sample holder positioned on an outer surface of a mandrel; pressing the sample against the mandrel with a distal end of a retractable holder with a predetermined force; powering a motor that is operably connected to the mandrel to rotate the mandrel in a first direction from an initial mandrel angle to a final mandrel angle such that a distal end of the sample is positioned between the retractable holder and the mandrel, and the sample conforms to the outer surface of the mandrel; and powering the motor to rotate the mandrel in a second direction from the final mandrel angle to the initial mandrel angle such that a proximal end of the sample is positioned between the retractable holder and the mandrel, and the sample cantilevers from the sampler holder without conforming to the outer surface of the mandrel.

In some embodiments, the method further comprises connecting an end of a sample carrier to the sample holder, wherein the sample is positioned between a first flexible layer and a second flexible layer of the sample carrier to secure the sample to the sample holder. In various embodiments, the method further comprises connecting a test cable to a distal end of the sample to monitor at least one parameter of the sample. In some embodiments, the at least one parameter is one of a strain of the sample, a temperature of the sample, or a tensile strength of the sample. In some embodiments, the method further comprises changing the predetermined force applied by the distal end of the retractable holder. In various embodiments, the method further comprises controlling, by a control unit operably connected to the motor, at least one of a rotation speed of the mandrel between the first mandrel angle and the second mandrel angle, a dwell time at the first mandrel angle, a dwell time at the second mandrel angle, and a number of cycles.

Yet another particular embodiment of the present disclosure is a testing system for a flexible sample, comprising: an upper member having: a first downwardly-descending arm having at least one mandrel that defines at least one slot; a second downwardly-descending arm having at least one mandrel that defines at least one slot; and a lower member having: an upwardly-ascending arm having a first mandrel and a second mandrel that define a central slot, wherein the upper member moves relative to the lower member such that a portion of a sample positioned in the at least one slot of the first downwardly-descending arm, the at least one slot of the second downwardly-descending arm, and the central slot conforms to one of the first and second mandrels of the upwardly-ascending arm.

In some embodiments, the at least one mandrel of the first downwardly-descending arm, the at least one mandrel of the second downwardly-descending arm, and the first and second mandrels of the upwardly-ascending arm have a common radius. In various embodiments, the at least one mandrel of the first downwardly-descending arm and the at least one mandrel of the second downwardly-descending arm have a radius that is distinct from a radius of the first mandrel and a radius of the second mandrel of the upwardly-ascending arm. In some embodiments, a fastener secures the first downwardly-descending arm through a slot in the upper member, and another fastener secures the second downwardly-descending arm through the upper member such that a distance between the downwardly-descending arms is adjustable. In various embodiments, a fastener secures the first mandrel through a slot in the upwardly-ascending arm, and another fastener secures the second mandrel to the upwardly-ascending arm such that a size of the central slot is adjustable.

The following definitions may be used in this disclosure.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "automatic" and variations thereof refer to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" refers to any computer-readable storage and/or transmission medium that participate in providing instructions to a processor for execution. Such a computer-readable medium can be tangible, non-transitory, and non-transient and take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "computer readable storage medium" may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium and that can communicate, propagate, or transport a program for use by or in connection with an instruction execution system, apparatus, or device. A computer readable signal medium may convey a propagated data signal with computer readable program code embodied therein, for example, in baseband or as part of a carrier wave. Such a propagated signal may take any of a variety of forms, including, but not limited to, electro-magnetic, optical, or any suitable combination thereof. Program code embodied on a computer readable signal medium may be transmitted using any appropriate medium, including but not limited to wireless, wireline, optical fiber cable, RF, etc., or any suitable combination of the foregoing.

The terms "determine", "calculate" and "compute," and variations thereof, are used interchangeably and include any type of methodology, process, mathematical operation or technique.

"Means" shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The term "module" refers to any known or later developed hardware, software, firmware, artificial intelligence, fuzzy logic, or combination of hardware and software that is capable of performing the functionality associated with that element.

What is claimed is:

1. A testing system for a flexible sample, comprising:
    a motor that rotates a mandrel in a first direction about a longitudinal axis and in an opposing second direction, wherein a first portion of the mandrel has a first radius from the longitudinal axis to an outer surface of the mandrel, and a second portion of the mandrel has a second radius from the longitudinal axis to the outer surface of the mandrel, wherein the second radius is distinct from the first radius;
    a holder positioned on an outer surface of the mandrel, wherein the holder is configured to secure a sample to the first portion of the mandrel;
    a retractable holder having a distal end that is biased toward the first portion of the mandrel such that the distal end contacts the sample with a predetermined force, wherein the retractable holder is configured to conform the sample to the outer surface of the mandrel as the mandrel rotates;
    a sample carrier extending between a first end proximate to the holder and a second end distal to the holder, wherein the holder secures the first end of the sample carrier to the first portion of the mandrel; and
    a first flexible layer and a second flexible layer of the sample carrier that define a space therebetween configured to receive the sample to secure the sample to the mandrel.

2. The testing system of claim 1, further comprising:
at least one sidewall defining an enclosed volume around the first portion and the second portion of the mandrel, the holder, and the retractable holder, and wherein an environment device controls at least one parameter of the enclosed volume for testing of the sample.

3. The testing system of claim 2, wherein the environment device is one of a humidifier, a dehumidifier, a heater, or a cooler.

4. The testing system of claim 1, wherein the retractable holder comprises:
a roller connected to a body such that the roller is the distal end of the retractable holder, and the roller is configured to rotate relative to the body about an axis that is parallel to the longitudinal axis; and
a bias member that acts against the body to press the roller into the sample with the predetermined force.

5. The testing system of claim 4, further comprising:
a support positioned above the mandrel; and
a post extending upward from the body through the support, wherein the bias member is a spring positioned about the post and acts against the support to press the roller into the sample with the predetermined force.

6. The testing system of claim 5, further comprising:
a nut threadably connected to the post between the body and the bias member such that the bias member contacts the nut to act against the body and press the roller into the sample with the predetermined force.

7. The testing system of claim 1, further comprising:
a second holder positioned on the second portion of the mandrel, wherein the second holder is configured to secure a second sample to the second portion of the mandrel; and
a second retractable holder having a distal end that is biased toward the second portion of the mandrel such that the distal end of the second retractable holder contacts the second sample with a second predetermined force, wherein the second retractable holder is configured to conform the second sample to the outer surface of the mandrel as the mandrel rotates.

8. The testing system of claim 1, wherein the first portion of the mandrel is positioned closer to the motor than the second portion of the mandrel, and the first radius is larger than the second radius.

9. A method for testing a flexible sample, comprising:
securing a sample to a holder positioned on an outer surface of a mandrel;
pressing the sample against the mandrel with a distal end of a retractable holder with a predetermined force;
powering a motor that is operably connected to the mandrel to rotate the mandrel in a first direction from an initial mandrel angle to a final mandrel angle such that a distal end of the sample is positioned between the retractable holder and the mandrel, and the sample conforms to the outer surface of the mandrel;
powering the motor to rotate the mandrel in a second direction from the final mandrel angle to the initial mandrel angle such that a proximal end of the sample is positioned between the retractable holder and the mandrel, and the sample cantilevers from the sampler holder without conforming to the outer surface of the mandrel; and
connecting an end of a sample carrier to the holder, wherein the sample is positioned between a first flexible layer and a second flexible layer of the sample carrier to secure the sample to the holder.

10. The method of claim 9, further comprising:
connecting a test cable to a distal end of the sample to monitor at least one parameter of the sample.

11. The method of claim 10, wherein the at least one parameter is one of a strain of the sample, a temperature of the sample, or a tensile strength of the sample.

12. The method of claim 9, further comprising:
changing the predetermined force applied by the distal end of the retractable holder.

13. The method of claim 9, further comprising:
controlling, by a control unit operably connected to the motor, at least one of a rotation speed of the mandrel between the first mandrel angle and the second mandrel angle, a dwell time at the first mandrel angle, a dwell time at the second mandrel angle, and a number of cycles.

* * * * *